US009372115B2

(12) United States Patent
Oskotsky et al.

(10) Patent No.: US 9,372,115 B2
(45) Date of Patent: Jun. 21, 2016

(54) AIRBORNE HYPERSPECTRAL SCANNING SYSTEM WITH REFLECTIVE TELECENTRIC RELAY

(71) Applicant: BAE Systems Information and Electronic Systems Integration Inc., Nashua, NH (US)

(72) Inventors: Mark L. Oskotsky, Mamaroneck, NY (US); Daniel Engheben, Roslyn Heights, NY (US); John J. MacEachin, Massapequa, NY (US); Jacinto E. Malabuyoc, Holbrook, NY (US); Shawn C. Reven, Greenlawn, NY (US); Michael J. Russo, Jr., Roslyn, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 17 days.

(21) Appl. No.: 14/451,545

(22) Filed: Aug. 5, 2014

(65) Prior Publication Data
US 2016/0041033 A1 Feb. 11, 2016

(51) Int. Cl.
*G01J 3/28* (2006.01)
*G01J 3/04* (2006.01)
*G01J 3/02* (2006.01)

(52) U.S. Cl.
CPC ............ *G01J 3/2823* (2013.01); *G01J 3/0205* (2013.01); *G01J 3/04* (2013.01)

(58) Field of Classification Search
CPC ......... G01J 3/2823; G01J 3/0205; G01J 3/04; G01J 3/06
See application file for complete search history.

(56) References Cited

U.S. PATENT DOCUMENTS

| | | | | | |
|---|---|---|---|---|---|
| 5,880,834 | A * | 3/1999 | Chrisp | ...................... | G01J 3/02 356/305 |
| 6,046,857 | A * | 4/2000 | Morishima | ........ | G02B 27/0172 359/434 |
| 6,100,974 | A * | 8/2000 | Reininger | ................. | G01J 3/02 356/300 |
| 6,122,051 | A * | 9/2000 | Ansley | ....................... | G01J 3/02 250/339.05 |
| 6,252,728 | B1 * | 6/2001 | Togino | .................. | G02B 13/06 359/720 |
| 6,721,057 | B1 * | 4/2004 | Reininger | ................. | G01J 3/02 356/450 |
| 6,886,953 | B2 * | 5/2005 | Cook | ........................ | G01J 3/02 359/858 |
| 7,382,498 | B1 * | 6/2008 | Cook | ........................ | G01J 3/02 356/326 |
| 8,436,992 | B2 * | 5/2013 | Robinson | .............. | G01J 3/0256 356/328 |
| 2010/0238440 | A1* | 9/2010 | Oskotsky | .................. | G01J 3/02 356/328 |
| 2013/0146771 | A1* | 6/2013 | Cook | ...................... | G01J 5/061 250/339.07 |

* cited by examiner

*Primary Examiner* — Kara E Geisel
*Assistant Examiner* — Dominic J Bologna
(74) *Attorney, Agent, or Firm* — Daniel J. Long; Sand & Sebolt, LPA

(57) ABSTRACT

An airborne hyperspectral scanning system with a reflective telecentric relay including a system housing fore-optics, mounted in the housing, an imaging spectrometer mounted in the housing, the imaging spectrometer comprising a spectrometer slit, the spectrometer slit having an exit side and an entrance side, a focal plane array, a fold mirror, and at least three spectrometer mirrors, ordered sequentially, and in optical alignment with each other, and a reflective telecentric relay, mounted in the housing between the fore-optics and the imaging spectrometer, the reflective telecentric relay comprising a collimator module, a scanning mirror module, and an objective module, the objective module being situated to receive intermediate image from the fore-optics and reflect a collimated beam to the scanning mirror image between the collimator module and the objective module, wherein the objective module is situated to form a telecentric image at the entrance of the spectrometer slit.

21 Claims, 7 Drawing Sheets

AIRBORNE HYPERSPECTRAL SCANNING SYSTEM WITH REFLECTIVE TELECENTRIC RELAY

STATEMENT OF GOVERNMENT INTEREST

This invention was made with United States Government support under Contract No. 11-c-0346 awarded by a classified agency. The United States Government has certain rights in this invention.

BACKGROUND OF THE INVENTION

1. Field of Invention

The present invention relates to airborne systems, and particularly to hyperspectral scanning systems incorporating relays.

2. Brief Description of the Related Art

Significant advances have been accomplished in the development of airborne hyperspectral systems. The hyperspectral sensor is a major part of airborne surveillance systems. The airborne sensor requires high performance optics that provides broad spectral coverage on over a deployed field of view (FOV). High spectral and spatial resolution also is required to detect and recognize ground targets from high altitude.

Typical airborne hyperspectral optical system consists of fore-optics, relay (or reimaging optical system) and spectrometer.

U.S. Pat. No. 6,886,953 (May 3, 2005) discloses imaging all-reflective spectrometer which consists of objective module in a form of three mirror anastigmat (TMA) or in a form of five powered mirrors and collimating-and-imaging module which comprises a set of three powered mirrors. The intermediate image is created between the objective module secondary and tertiary mirrors and intermediate pupil is created before the collimating-and-imaging module entrance slit. System includes imaging detector which receives a portion of the objective module output, and a hyper-spectral imaging detector that receives a portion of the output of the collimating-and-imaging module. There is no telecentric pattern of light at the intermediate pupil plane and cross field scanning cannot be implemented.

U.S. Pat. No. 5,880,834 (Mar. 9, 1999) discloses an imaging system having all-reflective fore-optics in the form of TMA, and an imaging Offner spectrometer. The fore-optics forms an intermediate image at a slit before the spectrometer. An off-axis primary spectrometer mirror delivers radiation onto a secondary spectrometer mirror/diffraction grating, and a tertiary spectrometer mirror reflects light from the grating to form multi-spectral images on a detector surface.

Further. U.S. Pat. No. 6,100,974 (Aug. 8, 2000) discloses an imaging all-reflective system including fore-optics also in the form of a TMA, and a dispersive Offner spectrometer consisting of three mirrors decentered with respect to one another. All relevant portions of the mentioned >834 and >974 U.S. patents are incorporated by reference.

Further, U.S. Pat. No. 7,944,559 (May 17, 2011) discloses airborne all-reflective hyperspectral imaging system with a fore-optics and Offner type spectrometer having one common axis of symmetry.

There are drawbacks of known hyperspectral imaging systems deployed in airborne and military applications, however. Existing hyperspectral imaging systems are not compact and cannot be deployed for scanning the target on the existing platforms.

Accordingly, there is a need for a high performance hyperspectral scanning imaging airborne system that is compact and provides good performance across the field and spectrum.

SUMMARY OF THE INVENTION

According to the invention, an airborne hyperspectral scanning system with reflective telecentric relay includes fore-optics deployed in a platform housing, and comprises of a primary fore-optics mirror, a secondary fore-optics mirror and a tertiary fore-optics mirror, wherein each of the mirrors has an associated reflective surface. The fore-optics mirrors, situated in a form of a TMA, are configured so that electromagnetic radiation or light from a distant object is collected on the surface of the primary fore-optics mirror and directed toward the surface of the secondary fore-optics mirror. The secondary fore-optics mirror directs the light toward the surface of the tertiary fore-optics mirror, and the tertiary mirror forms an intermediate image corresponding to the object at an entrance side of reflective telecentric relay. The fore-optics may be decentered with respect to an object in order to avoid vignetting and obscuration of the radiation coming from the target.

The airborne hyperspectral scanning system may also include a reflective telecentric relay mounted on the deployed platform housing and which is comprised of three modules. Two modules have optical powers and represent a collimating module and an objective module. The third module comprises a scanning mirror and is located between the collimating and objective modules. The relay configuration, relay magnification and relay focal length are defined along the central ray of the beam coming from the target. Relay modules fulfill three purposes: reimage intermediate TMA image onto the slit before the spectrometer, conjugate relay aperture stop located at the scanning mirror with TMA aperture stop and spectrometer aperture stop and provide telecentric pattern of radiation at both the scanning mirror and spectrometer slit planes.

Collimating power module comprises a relay primary mirror, a relay secondary mirror, a relay tertiary mirror, and a relay fourth mirror. The relay primary mirror is disposed in operative relation to an exit side of the TMA and converges beam from the TMA intermediate image, directing it onto the relay secondary mirror. The relay secondary mirror further converges the beam and directs it onto the relay tertiary mirror. Relay tertiary mirror diverges the beam and directs it to the relay fourth mirror. After the relay fourth mirror, radiation, collimated along the central ray of the beam, is directed onto the scanning mirror. The relay aperture stop is located at the scanning mirror and the collimator module conjugates the TMA aperture stop with a scanning mirror and objective module conjugates the scanning mirror with a spectrometer hard aperture stop. The combination of the relay primary and relay secondary mirrors represents a telephoto configuration and combination of the relay tertiary and relay fourth mirrors represents a reverse telephoto configuration for aberrational correction and compactness.

A scanning mirror module is placed in the telecentric pattern of radiation between the collimator module and the objective module and performs the cross field scan. Location of the mirror allows reducing size of the reflective optics along with compactness while obtaining the necessary field of view.

An objective module comprises a primary objective mirror, a second objective mirror and a third objective mirror. The objective module mirrors are formed as a triplet with a negative optical power mirror inside and positive optical power mirrors outside. The primary objective mirror is disposed in operative relation to an exit side of the scanning mirror and directs converged radiation onto the relay seventh mirror. The second objective mirror diverges the radiation and directs it onto the third objective mirror. The third objective mirror forms an intermediate telecentric image at an entrance side of a spectrometer slit. Primary, secondary, and third objective mirrors may also be referred to as relay sixth, seventh, and eighth mirrors respectively.

The Petzval field curvature of the relay is corrected to obtain a flat field along the central ray of the incoming beam of radiation. The relay mirrors' radii, air spacings between the mirrors and the mirrors' decentrations and tilts provide the solution for the compactness of the reflective telecentric relay and corrections of the field aberrations with respect to the central ray of the beam. The scanning mirror is located in the telecentric pattern of radiation and relay output is at the spectrometer slit plane is telecentric as well.

The imaging system may also include an imaging hyperspectral spectrometer, mounted in the deployed platform housing and which is comprised of a primary spectrometer mirror, a secondary spectrometer mirror and a tertiary spectrometer mirror, each of which has an associated reflective surface. The primary spectrometer mirror is disposed in operative relation to an exit side of the spectrometer slit, and the secondary spectrometer mirror has an associated diffraction grating. The spectrometer mirrors are configured so that light from the exit side of the spectrometer slit is incident on the surface of the primary mirror and directed toward the diffraction grating of the secondary mirror, diffracted light from the grating is incident on the surface of the tertiary mirror, and the tertiary mirror forms a final spatial and spectral image of the object on a focal plane array mounted in the housing.

Each reflective surface of the fore-optics mirrors, reflective telecentric relay mirrors and the spectrometer mirrors may be a segment of a defined solid surface which has a known axis of a rotational symmetry. The fore-optics, the reflective telecentric relay and the spectrometer mirrors segments may be mounted and aligned inside the system housing so that the optical axes all mirrors segments are defined along the chief ray of the incoming beam.

For a better understanding of the invention, reference is made to the following description taken in conjunction with the accompanying drawing and the appended claims.

BRIEF DESCRIPTION OF THE DRAWINGS

The apparatus and possible embodiments will be illustrated, without being limited in any way by the following description and possible embodiments in conjunction with the accompanying figures which show.

Like reference symbols in the various drawings indicate like elements.

DETAILED DESCRIPTION OF THE INVENTION

Figure 1:
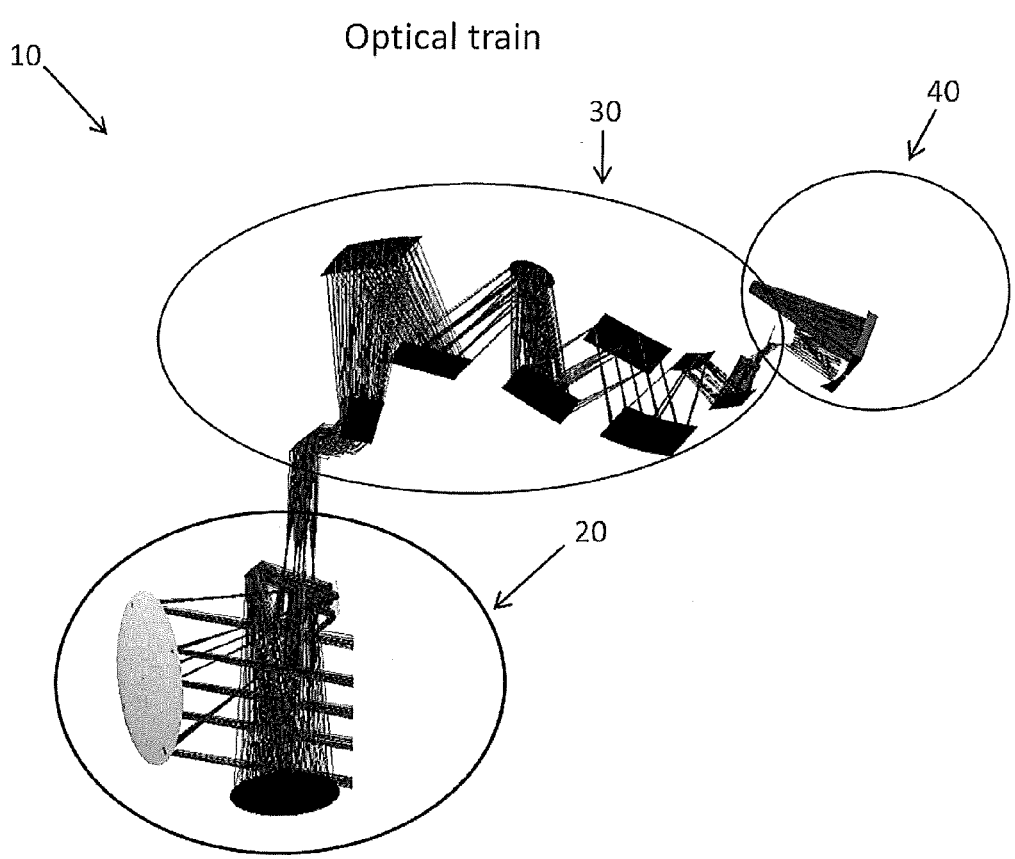
FIG. 1 is an optical train solid model configuration of a preferred embodiment of an airborne hyperspectral scanning system with reflective telecentric relay according to the invention.

Turning to FIG. 1, the preferred embodiment of an airborne hyperspectral scanning system with reflective telecentric relay according to the invention, system 10, is generally comprises of fore-optics 20, a reflective telecentric relay 30 and Offner imaging spectrometer 40. The spectrometer assembly may include focal plane array. All of them are assembled, aligned and contained within the existing deployed in a field housing (not shown in FIG. 1). Preferably, fore-optics 20 represents three-mirror anastigmat (TMA). Reflective telecentric relay assembly 30 output is telecentric at the slit before the spectrometer. Offner imaging spectrometer 40 is doubly telecentric so that the final image size will not change with an axial position of either the slit or the focal plane array. This enables constant spectral sampling regardless of the slit and focal position. A constant and known spectral sampling is necessary to identify an object via its spectral components. In addition, telecentricity at the image plane allows for an extremely uniform image plane illumination, which maximizes the utility of the focal plane array in system 10.

Figure 2:
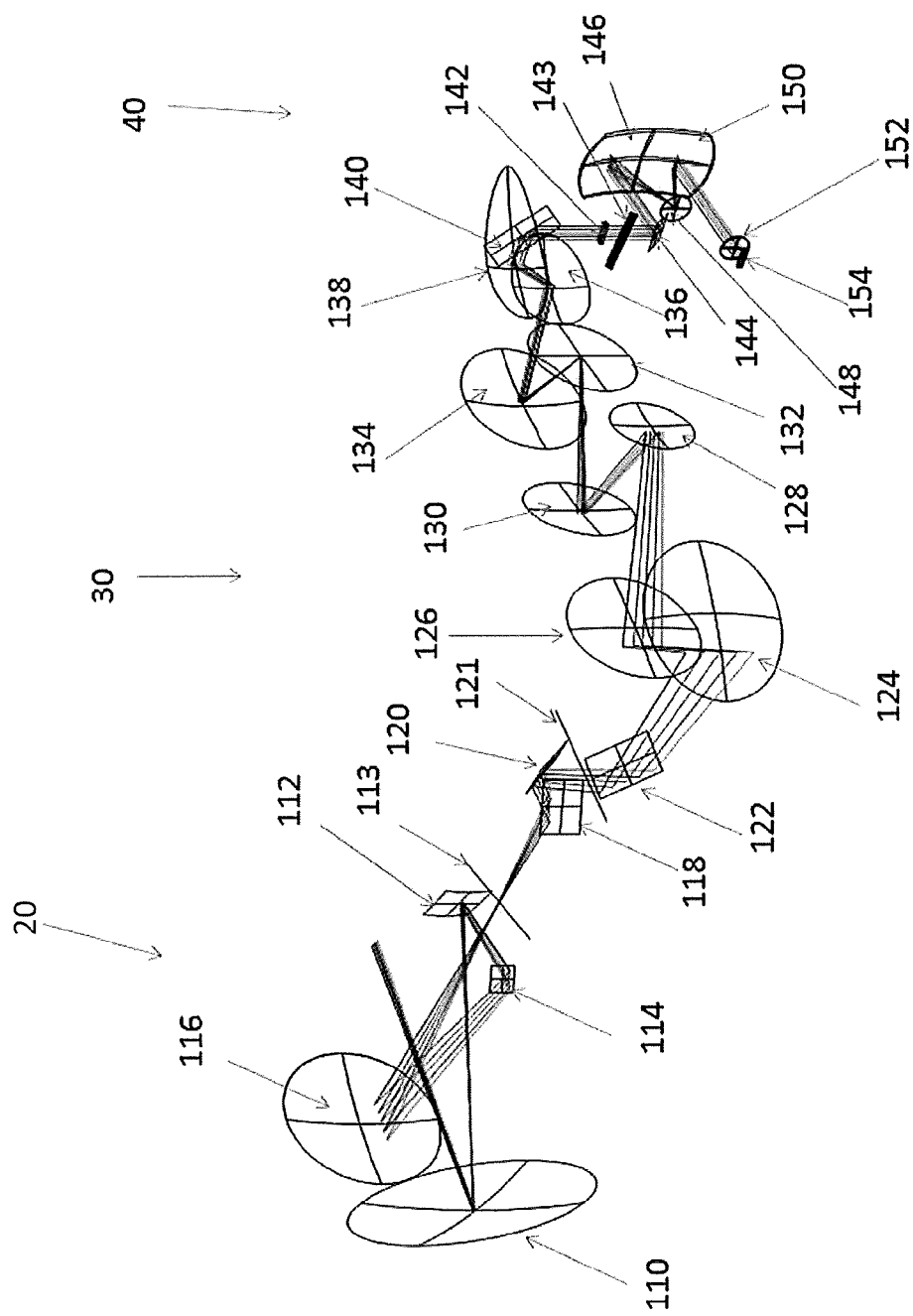
FIG. 2 is an optical train configuration of a preferred embodiment of an airborne hyperspectral scanning system with reflective telecentric relay, depicting only axial field for clarity.

Now turning also to FIG. 2, the preferred embodiment of an airborne hyperspectral scanning system with reflective telecentric relay where the ray trace, corresponding only to the axial field point and small number of rays, is depicted for clarity. Size of the mirrors is delimited by the clear apertures. Fore-optics 20 is configured as a three-mirror anastigmat and has primary fore-optics mirror 110 as a first optical component. Light rays from, e.g., an external scanning mirror are directed toward a reflective surface of primary mirror 110, and the reflective surface directs the light toward a reflective surface of secondary fore-optics mirror 112 which acts as a second optical component of fore-optics 20. Secondary fore-optics mirror 112 is conjugated with TMA aperture stop 113. Secondary fore-optics mirror 112 directs light toward a reflective surface of tertiary fore-optics mirror 116 through fold mirror 114. Tertiary fore-optics mirror 116 acts as a third optical component of fore-optics 20, and light rays from tertiary fore-optics mirror 116 through fold mirrors 118 and 120 forming intermediate image 121 at the entrance of reflective telecentric relay 30. This intermediate image is conjugated with spectrometer slit 143 located at the entrance of Offner imaging spectrometer 40. The TMA conic constants are used as the parameters to eliminate three third order aberrations: spherical, coma and astigmatism. The optical powers and air gaps between the mirrors are arranged to eliminate the field curvature when maintaining the focal length. All TMA mirrors and TMA aperture stop may have a common geometrical axis of symmetry to make assembly, alignment and test less laborious and less consuming time procedures. Additionally, TMA mirrors may not have a common geometrical axis of symmetry. The preferred embodiment utilizes a three mirror set up, but the use of additional intermediate mirrors is also anticipated.

Intermediate image 121 may be optically corrected to be substantially free of field curvature and distortion. If the distortions are too large, then adjacent spectral/spatial channels will overlap thus reducing the spectral sensitivity of the imaging system. Typical airborne hyperspectral imagers require both spectral and spatial distortions to be less than 0.2 pixels. Low distortion also aids the image scanning process.

The TMA, which may be used in multi-channel sensor's configuration, usually has to have a diffraction limited performance. The TMA performance depends on a TMA envelope; the larger the distance between the primary and secondary fore-optic mirrors, the easier it is to correct the field aberrations. In this case mirrors optical powers may be reduced, which may lead to the reduction of the angles of incidence of the chief and marginal rays at the mirrors.

The Petzval field curvature induced by the primary and tertiary mirrors is compensated by the secondary mirror optical power. A positive coma induced by the primary fore-optic mirror is compensated by the negative coma induced by the secondary and tertiary fore-optic mirrors. Making some of the mirrors aspherical allows compensation of a spherical aberration which is quite high in this type of design. The secondary and primary fore-optic mirrors can be made as second order aspheres for the large enough envelopes, for the compact design one or both of them preferably are high order aspheres.

Reflective telecentric relay 30 has multiple purposes:
1. Conjugate intermediate image after TMA with a slit before the spectrometer
2. Conjugate optical train pupils: TMA aperture stop, relay aperture stop located at the scanning mirror and Offner reflective spectrometer aperture stop located at the secondary spectrometer mirror.
3. Create telecentric pattern of rays at the scanning mirror and at the spectrometer slit.

Relay mirrors 124, 126, 128 and 130 represent a collimating module and objective mirrors 134, 136 and 138 represent an objective module. Scanning mirror 132 is disposed between the collimating and objective modules of the relay.

Light incoming from TMA is directed by fold mirror 122 toward a surface of relay first mirror 124. Relay first mirror 124 converges light and directs it onto a surface of relay second mirror 126. Relay second mirror 126 diverges the light and directs it toward relay third mirror 128. Relay third mirror 128 further diverges light and directs it toward relay fourth mirror 130. Then light is collimated by relay fourth mirror 130 and is directed onto scanning mirror 132. In the aforementioned embodiment, four relay mirrors are used, but the use of additional intermediate relay mirrors is anticipated. In order to accommodate a large field of view with relatively small optics, scanning mirror 132 may be positioned inside between the collimating module and objective module of relay in a telecentric pattern of light. Scanning mirror 130 allows continuous scanning across the field of view. In order to avoid vignetting and to maintain the uniform aperture and F-number (F#) across the field, the relay aperture stop may be located at the scanning mirror. Telecentric pattern of chief rays may be maintained at the scanning mirror in order to provide telecentric scanning with a scanning beam always perpendicular to the spectrometer slit and to not introduce the spatial (smile) and spectral (key stone) distortions. Moreover, telecentricity at the scanning mirror allows for lesser sensitivity to the scanning mirror positioning.

Scanning mirror 132 is conjugated with the TMA aperture stop by means of relay collimating module which consists of relay mirrors 124, 126, 128 and 130. Scanning mirror projects slit before spectrometer through the collimating module and fore-optics into the target space. Collimated light reflected from scanning mirror 132 is directed toward the relay objective module which consists of objective mirrors 134, 136 and 138. Primary objective mirror 134 converges light and directs it toward secondary objective mirror 136. Secondary objective mirror 136 diverges the light and directs it onto tertiary objective mirror 138. Tertiary objective mirror 138 collimates the light and directs it by fold mirror 140 through window 142 into spectrometer slit 143. Relay conjugates spectrometer slit 143 with intermediate image 121. Telecentric pattern of light at scanning mirror 132 and spectrometer slit 143 is maintained during the scanning process. The aforementioned objective module embodiment utilizes three objective mirrors, but the use of additional intermediate objective mirrors is also anticipated.

Hyperspectral spectrometer 40 may unfold spectrum into 170 spectral channels; this allows a precise detection of the spectral signatures of the target being scanned.

The spectrometer premises are as follows:
1. Wide spectral range from visible/near infrared to short wave infrared: from 0.8 nm to 2.5 nm.
2. High spatial resolution for both VNIR and SWIR bands.
3. Same field of view for all spectral bands +/−0.72°.

Spectrometer may be implemented in Offner form, and comprise of spectrometer window 142, spectrometer slit 143, fold mirror 144, spectrometer primary mirror 146, spectrometer secondary mirror 148, spectrometer tertiary mirror 150, detector assembly window 152 and focal plane array 154. The spectrometer slit has an entrance side and an exit side. Spectrometer slit 143 may be formed in a known manner, e.g., as a rectangle, and is typically from 40 to 80 microns (μm) wide. Slit width, a contributing factor to spectral resolution, may be oriented perpendicular to the axis around which scanning is performed. Slit length may be sufficient to accommodate the height of the intermediate image formed by the light rays from tertiary objective mirror 138 of the relay 20. Light coming from spectrometer slit 143 is directed by fold mirror 144 onto primary spectrometer mirror 146 and then converged light is directed toward secondary spectrometer mirror 148. Secondary spectrometer mirror represents diffraction reflective grating and a hard aperture stop may be placed at secondary spectrometer mirror 148. Secondary spectrometer mirror 148 disperses the light onto spectral channels with 10 nm spectral width and directs them onto tertiary spectrometer mirror 150. Tertiary spectrometer mirror 150 collimates the light and directs it through detector assembly window 152 onto the focal plane array 154. In the preferred embodiment spectrometer is made rotationally symmetric so that primary spectrometer mirror and tertiary spectrometer mirror are made as a one solid mirror working with different off axis reflective apertures.

In addition to the fundamental performance, a flat focal plane and telecentricity at the slit may be significant instrument design considerations. Telecentricity may be used in order to make performance less sensitive to the slit defocusing along the chief ray of the beam. Also telecentricity at the slit reduces variation of the spatial (smile) and chromatic (key stone) distortions during scanning.

At the scanning process, the airborne hyperspectral system delivers emitted reflected light which may include spectral information of the target to the focal plane array. The information may be developed and processed by special software. Then based on the output data the decision on target content can be made.

Some or all the reflective surfaces of the mirrors of fore-optics 20 may be segments of solid surfaces that are generally aspherical, i.e., surfaces that do not form part of a sphere such as, for example, surfaces that are ellipsoidal, hyperboloidal or paraboloidal in shape. Alternatively, some or all of the reflective surfaces may be conics, or spherical. In preferred embodiment these surfaces are rotationally symmetric and have a common geometrical axis, but it is not necessary. Preferably, for TMA the surfaces are segments of the following solid surfaces:

Primary fore-optics mirror 110: ellipsoidal
Secondary fore-optics mirror 112: hyperbolical
Tertiary fore-optics mirror 116: ellipsoidal Fore-optics 20 operates with off-axis apertures. In order to not obscure the radiation which comes from the target the TMA aperture stop decenter with respect to TMA common axis, field of view and TAM focal length along the chief ray shall have relations as follows:

$\Delta_{Stop}=0.02-0.04$ EFLc;

$tg\theta \times EFLc = -0.6 - -0.8$ inches,

Wherein, $\Delta_{STOP}$ is the decenter of the TMA aperture stop with respect to the TMA common axis along the axis parallel to the slit length;

$tg\theta$ is the tangent of the half of view angle;

EFLc is the TMA focal length along the chief ray.

Further, the relationships between constructive parameters of fore-optics 20 are preferably as follows:

$$\Phi_1/\Phi_2 = (-0.24) \text{ to } (-0.44)$$

$$\Phi_1/\Phi_3 = 0.50 \text{ to } 0.70$$

$$\Phi_1/\Phi_C = 0.25 - 0.44$$

$$D_1/D_2 = 0.55 - 0.85$$

$$D_1/EFL_C = 0.15 - 0.30$$

Wherein, $\Phi_1$, $\Phi_2$ and $\Phi_3$ are optical powers along the chief ray of the primary, the secondary, and the tertiary fore-optics mirrors 110, 112, 116, respectively. $\Phi_C$ is the optical power along the chief ray of the whole TMA. $D_1$ and $D_2$ are the distances along the chief ray between the primary and secondary TMA mirrors, $EFL_C$ is the focal length along the chief ray of the TMA.

It has been demonstrated that the foregoing relationships among the optical powers of fore-optics 20 allow for correction of cross field coma, astigmatism and field curvature at intermediate image 121. Also foregoing relationships allow correction of the pupil spherical aberration and coma.

Figure 3:
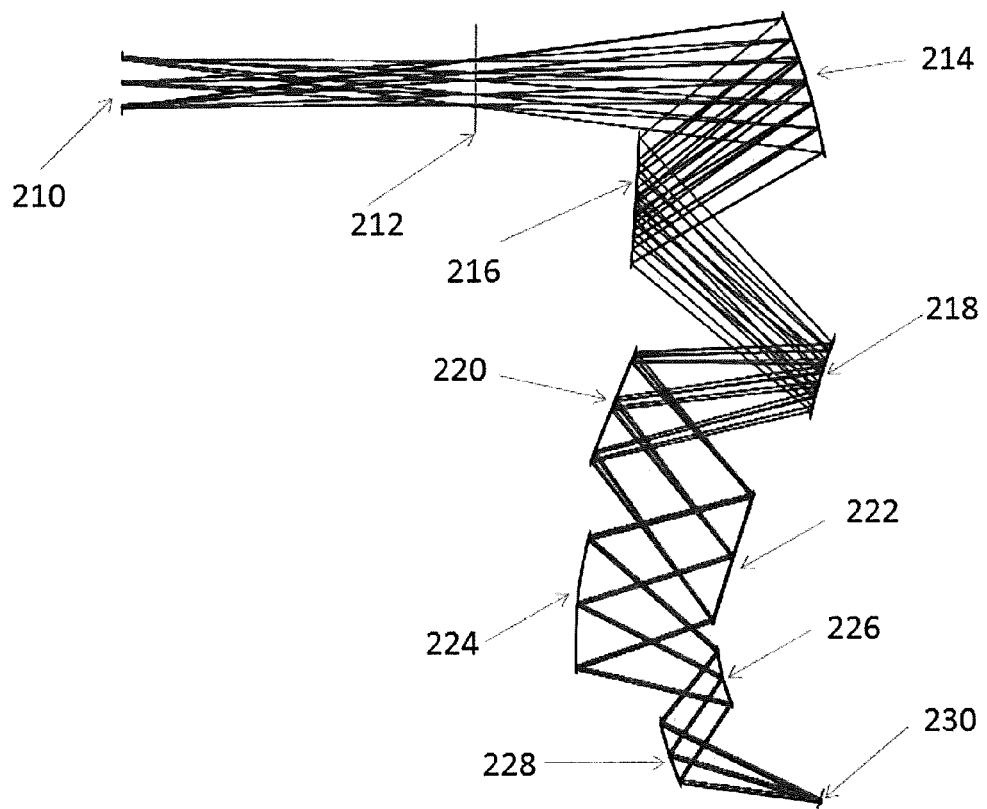
FIG. 3 is an unfolded optical diagram of a reflective telecentric relay showing only working segments of the relay mirrors.

For clarity, optical diagram of a reflective telecentric relay for the full field, showing only working off axis segments of the relay mirrors, is presented in FIG. 3. Light enters relay through TMA aperture stop 210 and the TMA intermediate image is formed at plane 212. Relay may include collimating and objective modules and scanning mirror assembly.

According to an embodiment, the collimator module may comprise of collimator module first mirror 214, collimator module second mirror 216, collimator module third mirror 218 and fourth mirror 220. Collimator module fifth mirror 222 may be a scanning mirror and is disposed in the light collimated around the chief ray and rotates around the axis perpendicular to the plane of drawing and along the slit length. The combination of the collimator module first mirror 214 and collimator module second 216 may represent a telephoto configuration and combination of the collimator module third mirror 218 and collimator module fourth mirror 220 may represent a reverse telephoto configuration necessary for aberrational correction and compactness.

A scanning mirror module may be placed in the telecentric pattern of radiation between the collimation and objective modules and performs the cross field scan. A scanning mirror module may comprise of a scanning mirror. Location of the mirror allows reducing size of the reflective optics along with compactness while obtaining the necessary field of view.

Scanning mirror may be conjugated with TMA aperture stop and spectrometer aperture stop. An objective module may comprise of objective primary mirror 224, objective second mirror 226 and objective third mirror 228. Spectrometer entrance slit 230 is centered with respect to the chief ray of the beam. Telecentric pattern of rays is maintained at the slit. The objective module mirrors are formed as a triplet with objective secondary mirror 226, having negative optical power, inside and objective primary mirror 224 and third mirror 228, having positive optical power, outside.

Each reflective telecentric relay mirror may be decentered with respect to the TMA intermediate image and with respect to each other. The geometrical axis of each of relay mirror may not coincide with the chief ray of the beam. This configuration allows compactness and adds degrees of freedom for achieving a necessary performance at the slit plane.

Figure 4:
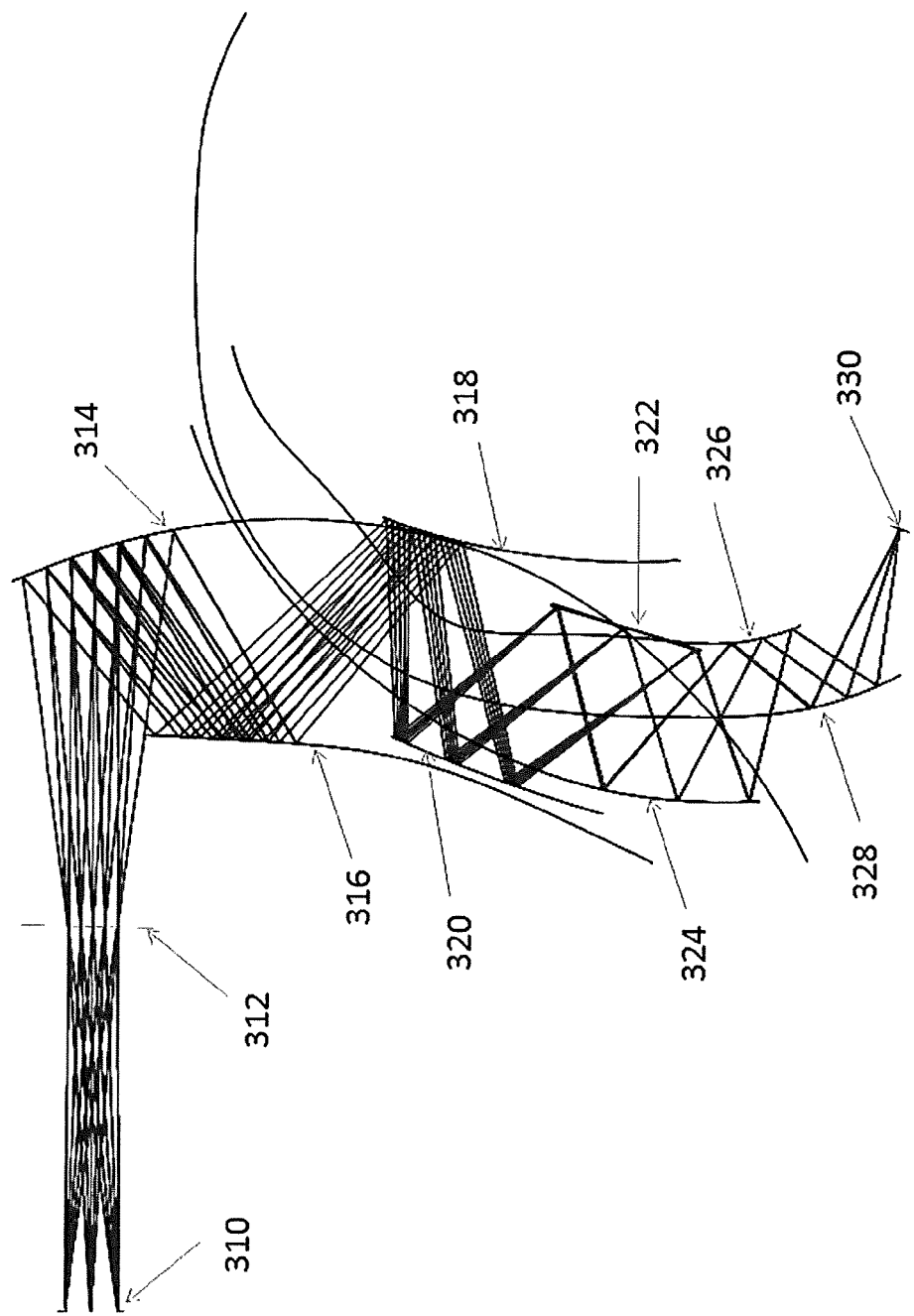
FIG. 4 is an optical diagram of a reflective telecentric relay showing full surface profiles of the relay mirrors.

Turning now also to FIG. 4, an embodiment may be an unfolded configuration of the reflective telecentric relay. FIG. 4 shows full surface profiles of the relay mirrors and optical path. Light after the TMA goes through TMA aperture stop 310. The TMA forms an image at intermediate image plane 312. Then intermediate image plane 312 is conjugated with slit 330. A relay collimator module first mirror (314) may have a positive optical power. Its surface profile may represent a high order aspherical elliptical surface. A relay collimator module second mirror (316) may have a negative optical power and its profile may represent a high order aspherical hyperbolical surface. A relay collimator module third mirror (318) may have a negative optical power profile representing a high order aspherical oblique elliptical surface. A relay collimator module fourth mirror profile (320) represents a high order aspherical hyperbolical surface. Scanning mirror 322 may be flat, and centered at the chief ray of the light beam and rotates around the axis parallel to the slit long side, imaging slit onto the object space through the collimation module of the relay and TMA. A relay objective first mirror (324) may represent a high order aspherical elliptical surface. A relay objective second mirror (326) may represent a high order aspherical hyperbolical surface. A relay objective third mirror (328) may represent a high order aspherical elliptical surface. One can see that all relay mirrors work with off axis segments and beam is reflected in a very narrow compact tunnel as it goes from the intermediate image to the slit. Relay may maintain telecentric pattern of light at the slit; this feature allows slit insensitivity to the defocusing while providing a necessary correction of the spectral and spatial distortions. Mutual combination of the relay mirror profiles, mirrors tilts and decentrations with respect to mirrors geometrical axes leads to along chief ray aberrational correction and low F#3.2 along the chief ray.

In order to provide all foregoing features the relations between constructive parameters of the telecentric reflective relay presented in FIG. 3 and FIG. 4 are preferably as follows:

$$\Phi_{1CC}/\Phi_{2CC}=(-5.50)-(-6.50)$$

$$\Phi_{2CC}/\Phi_{3CC}=2.50-3.60$$

$$\Phi_{3CC}/\Phi_{4CC}=(-0.25)-(-0.50)$$

$$\Phi_{6OC}/\Phi_{7OC}=(-4.10)-(-4.85)$$

$$\Phi_{7OC}/\Phi_{8OC}=(-0.10)-(-0.35)$$

$$\Phi_{RC}/\Phi_{OC}=(0.60)-(-0.80)$$

$$\Phi_{CC}/\Phi_{OC}=(-0.35)-(-0.50)$$

$$EFL_{RC}/OP_{RC}=0.08-0.20$$

$EFL_{RC}/EFL_{TMAC}=2.50-3.50$ $EFL_{RC}/EFL_{TMAC}=0.075-0.095$

Wherein, $\Phi_{1CC}$, $\Phi_{2CC}$, $\Phi_{3CC}$, $\Phi_{4CC}$ are optical powers along the chief ray of the relay collimator module first, second, third and fourth mirrors; $\Phi_{6OC}$, $\Phi_{7OC}$, $\Phi_{8OC}$ are optical powers along the chief ray of relay objective module sixth, seventh and eighth mirrors; $\Phi_{RC}$, $\Phi_{CC}$ and $\Phi_{OC}$ are optical powers along the chief ray of the relay and collimating and objective modules correspondingly; $EFL_{RC}$ is effective focal length along the chief ray of the relay; $OP_{RC}$ is optical path along the chief ray between the relay first and last mirrors; $EFL_{RP}$ is paraxial effective focal length of the relay; and $EFL_{TMAC}$ is the TMA effective focal length along the chief ray.

Figure 5:
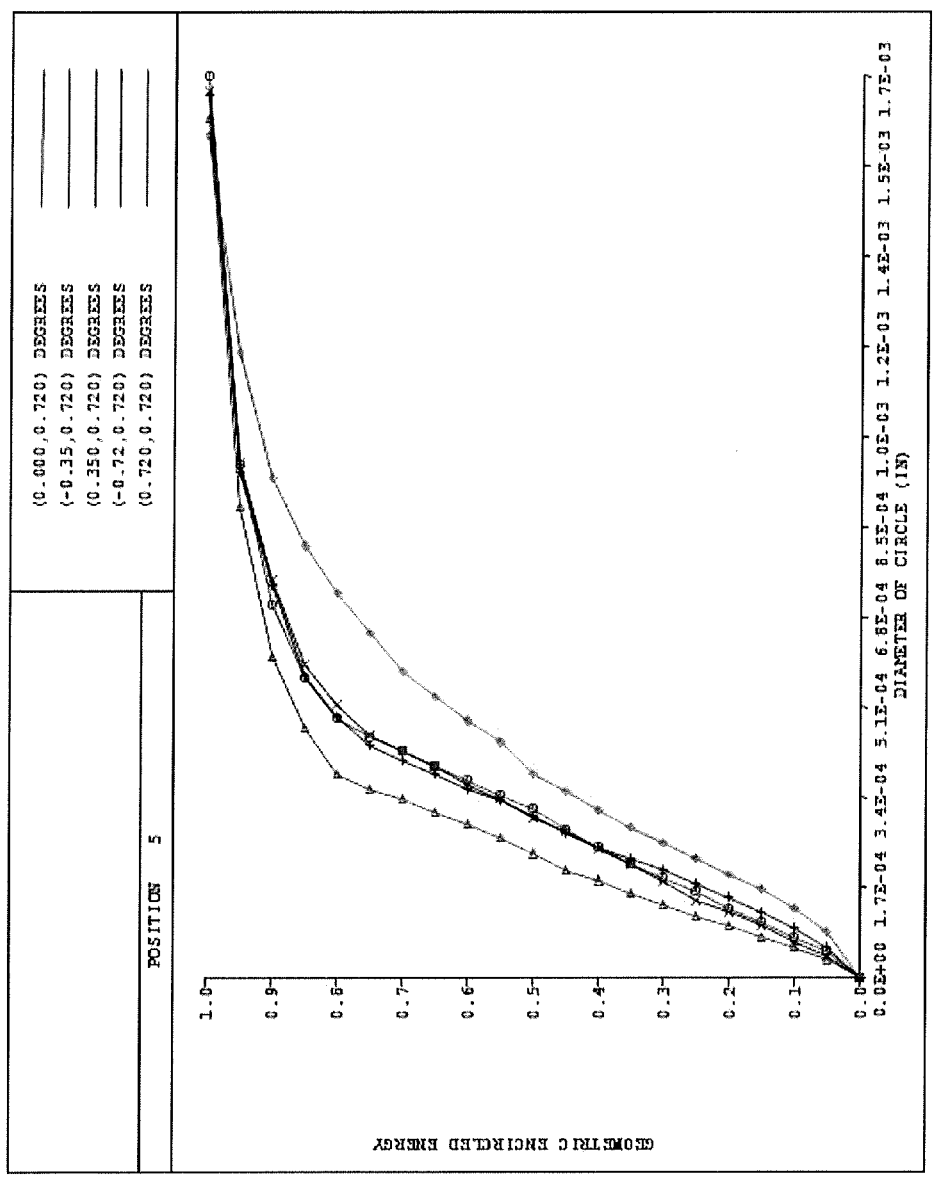
FIG. 5 is a depiction of radial energy distribution at the slit for the middle position of a scanning mirror.

Foregoing relations allow for the relay to provide a good performance at the slit: all energy is concentrated in a blur spot less than 0.0018 inches—see FIG. 5.

Imaging spectrometer in the preferred embodiment represents a tree-mirror Offner type configuration with a common geometrical axis for all three mirrors. According to FIG. 2 imaging spectrometer 40 in system 10 of FIG. 1 has primary spectrometer mirror 146 with a reflective surface that is positioned to receive light exiting from the spectrometer slit 143, and to direct the light toward secondary spectrometer mirror 148. Secondary spectrometer mirror 148 acts as an aperture stop and incorporates diffractive element on its surface. Diffracted light having spectral components, with wavelengths between 2500 nm and 800 nm, is reflected by secondary spectrometer mirror 148 toward a reflective surface of tertiary spectrometer mirror 150. Tertiary spectrometer mirror 150 then forms an image of the diffracted light on an active surface of focal plane array 154. The image should be substantially free from spatial and spectral distortions. According to and embodiment of the invention, each of the reflective surfaces of the mirrors 146, 148 and 150 of Offner imaging spectrometer 40 may be a segment of a solid surface which has a known geometrical axis of symmetry, that is, each reflective surface may be rotationally symmetric about the axis of symmetry of the solid surface of which it is a segment. In the preferred embodiment spectrometer primary mirror 146 and spectrometer tertiary mirror 150 may represent off axis segments of one reflective surface and the center of primary mirror 146's clear aperture may be positioned at the point of intersection of the chief ray coming from spectrometer slit 143 with a primary mirror 146 surface. According to the preferred embodiment all spectrometer mirrors may be spherical, but they also may be performed as aspherical surfaces. In order to correct aberrations with respect to the chief ray spectrometer mirrors may be decentered with respect to each other.

Moreover, relationships between constructive parameters of the imaging spectrometer are preferably as follows:

$\Phi_{1SC}/\Phi_{2SC}=0.40-0.60$ $\Phi_{1SC}/\Phi_{3SC}=0.85-1.15$ $\Delta_{SLIT}/EFL_{1SC}=0.35-0.45$ $EFL_{1SC}/EFL_{RC}=0.70-0.80$ Wherein, $\Phi_{1SC}$, $\Phi_{2SC}$ and $\Phi_{3SC}$ are optical powers along the chief ray of the primary, the secondary and the tertiary imaging spectrometer mirrors respectively; $\Delta_{SLIT}$ is the decentration of the slit in direction perpendicular to the slit long side with respect to the geometrical axis of the spectrometer primary mirror; $EFL_{1SC}$ is the effective focal length along the chief ray of the spectrometer primary mirror; $EFL_{RC}$ is the effective focal length along the chief ray of the relay.

Referring to FIG. 2 it has been demonstrated that the foregoing relationships among the optical powers of fore-optics 20, reflective telecentric relay 30 and Offner imaging spectrometer 40 allow for correction of coma, astigmatism and field curvature at both spectrometer slit 143 and focal plane array 154. Spectral and spatial distortion magnitudes do not exceed 1/10th of a pixel for a 25 micron pixel size. Other desirable results are that reflective telecentric relay 30 and imaging spectrometer 40 both are doubly telecentric, the field of view is large, FNO is low and spectral sampling is high.

Figure 6:
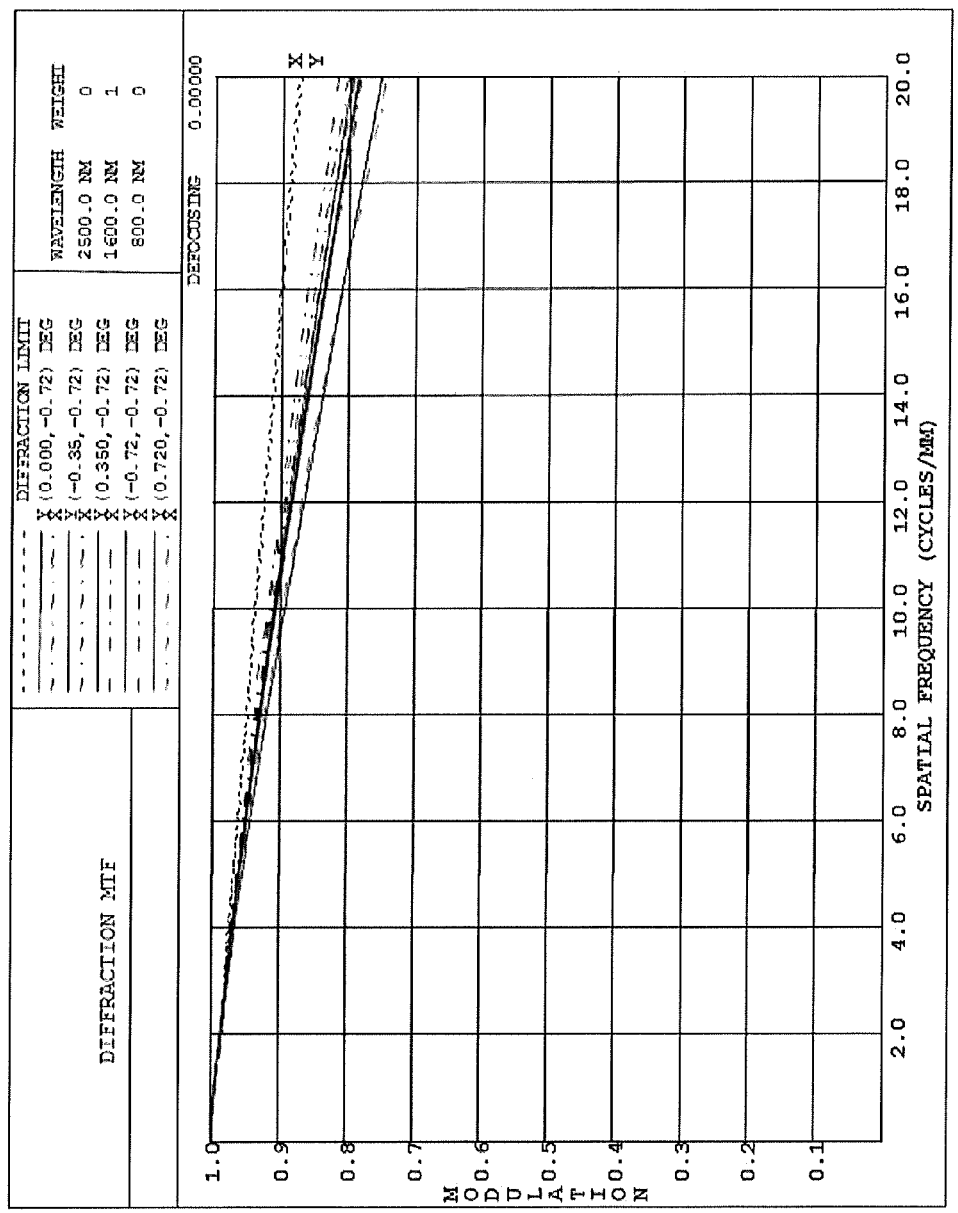
FIG. 6 is a depiction of MTF curves of the airborne hyperspectral system for the middle position of a scanning mirror.

The systems 10 of FIG. 1 can meet the following specification, when constructed as described above. FIG. 6 shows a Modulation Transfer Function (MTF) calculated for the airborne hyperspectral system with reflective telecentric relay.

Figure 7:
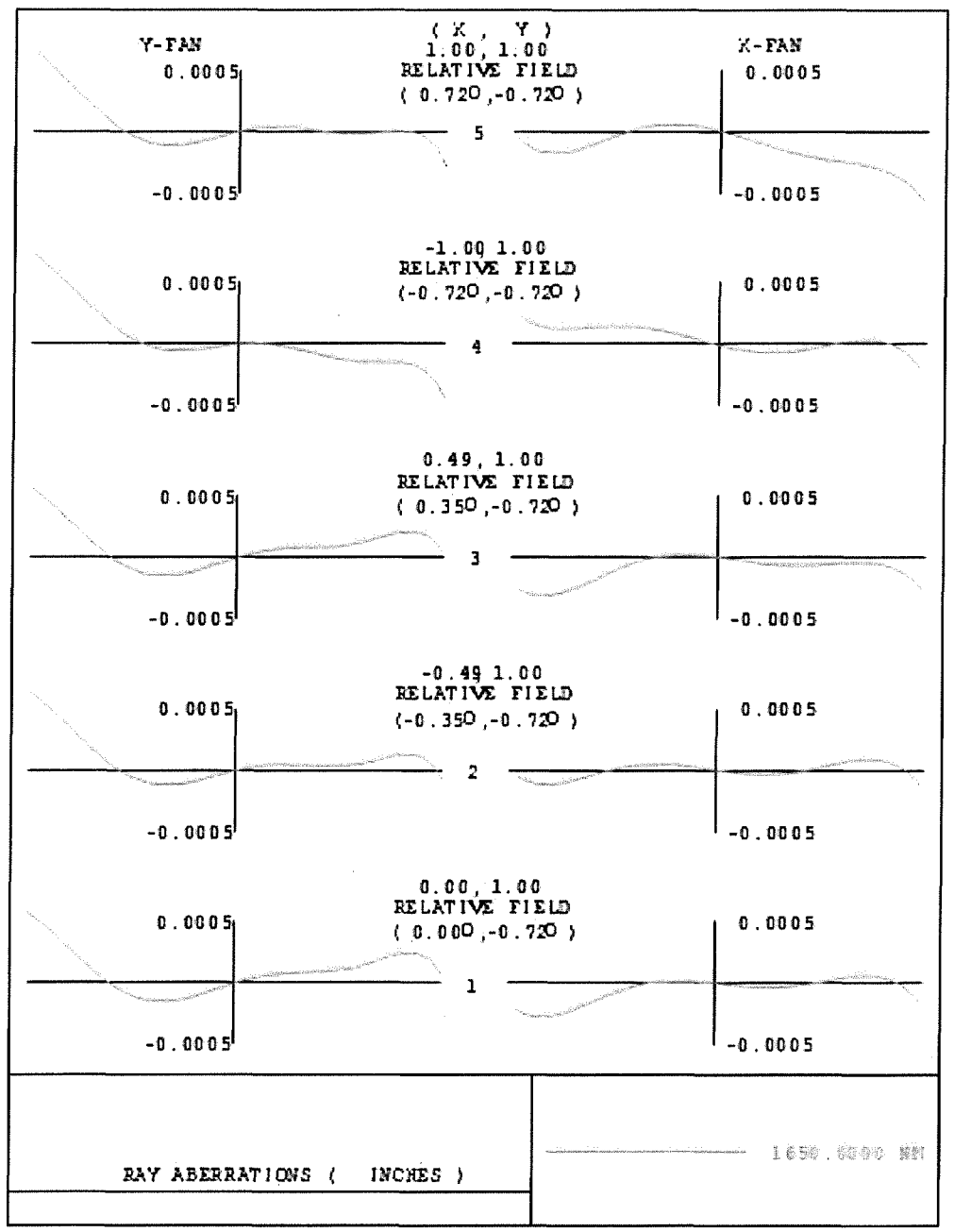
FIG. 7 is a depiction of RIM RAY curves of the airborne hyperspectral system for the middle position of a scanning mirror.

FIG. 7 shows RIM RAY curves across the field for the Airborne Hyperspectral System With Reflective Telecentric Relay, with values as follows:

| | |
|---|---|
| FOV | +/−0.72° linear, scan |
| WL | 2500 nm-800 nm |
| EFY, EFX along the chief ray | 25" |
| Anamorphic distortion | <5% |
| FNO along the chief ray | 3.3 |
| Detector | 640 pixels, 25 μm each; +/−0.315" field linear |
| Spectral resolution | 10 nm |
| Number of spectral channels | 170 |
| Spectral spread | 0.167" |
| 100% radial energy at the slit | 0.0018" |
| MTF as built | 0.35 20 lp/mm |
| Smile, key stone | <0.1 pixels |

A preferred embodiment of the airborne hyperspectral scanning system with reflective telecentric relay described herein is compact and can be mounted onto existing housing of airborne sensors platforms. Hyperspectral scanning system with reflective telecentric relay according to the invention allows scanning the target during the flight for recognition of the target content based on the spectral sampling. System provides an aberrational correction of the imaging slit with a spatial and spectral distortions correction. The fore-optics accepts electromagnetic radiation or light from distant objects, and forms an intermediate image before the reflective telecentric relay. A reflective relay, consisting of collimator, scanning mirror and objective modules, accepts electromagnetic radiation for the intermediate image and forms a well corrected telecentric image at an entrance of the spectrometer slit. A scanning mirror inside the relay may be located at the collimated light pattern for the chief ray distortion correction during scanning. Light exiting the slit is directed by a primary mirror of the imaging spectrometer to a diffraction grating at a secondary mirror of the spectrometer. Diffracted light from the grating is directed toward a tertiary spectrometer mirror which forms an image pattern on a focal plane array. The image pattern represents multiple spectral components of the intermediate image at the slit. Defined relationships between the optical powers of the fore-optics and the imaging spectrometer components enable correction of spatial and spectral distortion as well as near diffraction-limited image quality.

The inventive system preferred embodiment according to FIG. 1-FIG. 7 has a low F-number of 3.3 along the chief ray and a wide field of scanning view. The spectral wavelength range is 800 nm to 2500 nm and the field is 0.630 inches spatial by 0.167 inches spectral. Compared to existing systems, this system is very compact and may be fit to the existing airborne sensors.

Sequence 1 is an optical prescription of an airborne hyperspectral scanning system with reflective telecentric relay according to the invention.

| Sequence 1 | | | | | | |
|---|---|---|---|---|---|---|
| RDY | THI | RMD | GLA | CCY | THC | GLC |
| OBJ: INFINITY | INFINITY | | | | 100 | 100 |
| 1: INFINITY | 20.000000 | | | 100 | 100 | |
| 2: INFINITY | 0.000000 | REFL | | | 100 | 100 |
| XDE: 0.000000 | | YDE: 0.000000 | | ZDE: −7.450000 DAR | | |
| XDC: 100 | | YDC: 100 | | ZDC: 100 | | |
| ADE: 0.000000 | | BDE: −44.152500 | | CDE: 0.000000 | | |
| ADC: 100 | | BDC: 100 | | CDC: 100 | | |
| 3: INFINITY | −14.570000 | | | | 100 | 100 |
| SLB: "HEAD MIRROR" | | | | | | |
| XDE: 0.000000 | | YDE: 0.000000 | | ZDE: 0.000000 | | |
| XDC: 100 | | YDC: 100 | | ZDC: 100 | | |
| ADE: 0.000000 | | BDE: −90.000000 | | CDE: 0.000000 | | |
| ADC: 100 | | BDC: 100 | | CDC: 100 | | |
| 4: INFINITY | −12.000000 | | | 100 | 100 | |
| XDE: 6.200000 | | YDE: 0.000000 | | ZDE: 0.000000 DAR | | |
| XDC: 100 | | YDC: 100 | | ZDC: 100 | | |
| ADE: 0:000000 | | BDE: 0.000000 | | CDE: 0.000000 | | |
| ADC: 100 | | BDC: 100 | | CDC: 100 | | |
| 5: 27.80027 | 11.500000 | REFL | | | 100 | 100 |
| SLB: "TMA PRIMARY" | | | | | | |
| CON: | | | | | | |
| K: −0.918065 | | KC: 100 | | | | |
| XDE: 0.000000 | | YDE: 0.000000 | | ZDE: 0.000000 | | |
| XDC: 100 | | YDC: 100 | | ZDC: 100 | | |
| ADE: 0.000000 | | BDE: 0.000000 | | CDE: 0.000000 | | |
| ADC: 100 | | BDC: 100 | | CDC: 100 | | |
| 6: 9.58572 | −3.500000 | REFL | | | 100 | 100 |
| SLB: "TMA SECONDARY" | | | | | | |
| CON: | | | | | | |
| K: −6.736621 | | KC: 100 | | | | |
| 7: INFINITY | 13.500000 | REFL | | | 100 | 100 |
| SLB: "TMA FOLD" | | | | | | |
| XDE: 0.000000 | | YDE: 0.000000 | | ZDE: 0.000000 BEN | | |
| XDC: 100 | | YDC: 100 | | ZDC: 100 | | |
| ADE: 0.000000 | | BDE: −45.000000 | | CDE: 0.000000 | | |
| ADC: 100 | | BDC: 100 | | CDC: 100 | | |
| 8: −16.28677 | −13.500000 | REFL | | | 100 | 100 |
| SLB: "TMA TERTIARY" | | | | | | |
| CON: | | | | | | |
| K: −0.286025 | | KC: 100 | | | | |
| 9: INFINITY | −7.000000 | | | 100 | 100 | |
| SLB: "TMA STOP" | | | | | | |
| XDE: −1.650000 | | YDE: 0.000000 | | ZDE: 0.000000 | | |
| XDC: 100 | | YDC: 100 | | ZDC: 100 | | |
| ADE: 0.000000 | | BDE: 0.000000 | | CDE: 0.000000 | | |
| ADC: 100 | | BDC: 100 | | CDC: 100 | | |
| 10: INFINITY | 2.000000 | REFL | | | 100 | 100 |
| SLB: "COMMON FOLD MIRROR" | | | | | | |
| XDE: 0:000000 | | YDE: 0.000000 | | ZDE: 0.000000 BEN | | |
| XDC: 100 | | YDC: 100 | | ZDC: 100 | | |
| ADE: 0.000000 | | BDE: 45.000000 | | CDE: 0.000000 | | |
| ADC: 100 | | BDC: 100 | | CDC: 100 | | |
| 11: INFINITY | −2.958000 | REFL | | | 100 | 100 |
| SLB: "S2/S5 B/S" | | | | | | |
| XDE: 0.000000 | | YDE: 0.000000 | | ZDE: 0.000000 BEN | | |
| XDC: 100 | | YDC: 100 | | ZDC: 100 | | |
| ADE: 45.000000 | | BDE: 0.000000 | | CDE: 0.000000 | | |
| ADC: 100 | | BDC: 100 | | CDC: 100 | | |
| 12: INFINITY | 0.043213 | REFL | | | 100 | 100 |
| SLB: "S5 SELECT MIRROR" | | | | | | |
| XDE: 0.000000 | | YDE: 0.000000 | | ZDE: 0.000000 BEN | | |
| XDC: 100 | | YDC: 100 | | ZDC: 100 | | |
| ADE: 0.000000 | | BDE: 45.000000 | | CDE: 0.000000 | | |
| ADC: 100 | | BDC: 100 | | CDC: 100 | | |
| 13: INFINITY | 10.000000 | | | 100 | 100 | |
| SLB: "TILT/DECENTER COLLIMATOR" | | | | | | |
| XDE: 0.000000 | | YDE: −4.949467 | | ZDE: 0.000000 | | |
| XDC: 100 | | YDC: 100 | | ZDC: 100 | | |
| ADE: −3.588630 | | BDE: 0.000000 | | CDE: 0.000000 | | |
| ADC: 100 | | BDC: 100 | | CDC: 100 | | |
| 14: −14.49479 | −6.254185 | REFL | | | 100 | 100 |
| SLB: "COLLIMATOR PRIMARY" | | | | | | |
| ASP: | | | | | | |
| K: −0.474466 | | KC: 100 | | | | |
| CUF: 0.000000 | | CCF: 100 | | | | |
| A: 0.128434E−04 | B: −.112903E−06 | | C: 0.613316E−09 | | D: −.103771E−11 | |
| AC: 100 | BC: 100 | | CC: 100 | | DC: 100 | |

-continued

| Sequence 1 | | | | | |
|---|---|---|---|---|---|
| XDE: 0.000000 | YDE: −5.000000 | ZDE: 0.000000 | | | |
| XDC: 100 | YDC: 100 | ZDC: 100 | | | |
| ADE: −16.093140 | BDE: 0.000000 | CDE: 0.000000 | | | |
| ADC: 100 | BDC: 100 | CDC: 100 | | | |
| 15: | −13.63966 | 6.503065 | REFL | 100 | 100 |
| SLB: "COLLIMATOR SECONDARY" | | | | | |
| ASP: | | | | | |
| K: −12.000000 | | KC: 100 | | | |
| CUF: 0.000000 | | CCF: 100 | | | |
| A: 0.100573E−03 | B: −.129168E−05 | C: 0.112387E−07 | D: −.492277E−10 | | |
| AC: 100 | BC: 100 | CC: 100 | DC: 100 | | |
| XDE: 0.000000 | YDE: −0.397958 | ZDE: 0.000000 | | | |
| XDC: 100 | YDC: 100 | ZDC: 100 | | | |
| ADE: 5.193019 | BDE: 0.000000 | CDE: 0.000000 | | | |
| ADC: 100 | BDC: 100 | CDC: 100 | | | |
| 16: | 28.93329 | −6.430647 | REFL | 100 | 100 |
| SLB: "COLLIMATOR TERTIARY" | | | | | |
| ASP: | | | | | |
| K: 4.395149 | | KC: 100 | | | |
| CUF: 0.000000 | | CCF: 100 | | | |
| A: 0.583838E−03 | B: −.101196E−04 | C: 0.352256E−07 | D: −.100160E−08 | | |
| AC: 100 | BC: 100 | CC: 100 | DC: 100 | | |
| XDE: 0.000000 | YDE: −1.731746 | ZDE: 0.000000 | | | |
| XDC: 100 | YDC: 100 | ZDC: 100 | | | |
| ADE: 6.084009 | BDE: 0.000000 | CDE: 0.000000 | | | |
| ADC: 100 | BDC: 100 | CDC: 100 | | | |
| >17: | 43.92262 | 5.360463 | REFL | 100 | 100 |
| SLB: "COLLIMATOR FOURTH" | | | | | |
| ASP: | | | | | |
| K: −10.848628 | | KC: 100 | | | |
| CUF: 0.000000 | | CCF: 100 | | | |
| A: 0.196030E−05 | B: −.406711E−05 | C: 0.193729E−06 | D: −.628600E−08 | | |
| AC: 100 | BC: 100 | CC: 100 | DC: 100 | | |
| XDE: 0.000000 | YDE: −0.025136 | ZDE: 0.000000 BEN | | | |
| XDC: 100 | YDC: 100 | ZDC: 100 | | | |
| ADE: −11.968646 | BDE: 0.000000 | CDE: 0.000000 | | | |
| ADC: 100 | BDC: 100 | CDC: 100 | | | |
| 18: | INFINITY | 0.000000 | | 100 | 100 |
| XDE: 0.000000 | YDE: 0.000000 | ZDE: 0.000000 | | | |
| XDC: 100 | YDC: 100 | ZDC: 100 | | | |
| ADE: 13.798673 | BDE: 0.000000 | CDE: 0.000000 | | | |
| ADC: 100 | BDC: 100 | CDC: 100 | | | |
| 19: | INFINITY | 0.000000 | REFL | 100 | 100 |
| SLB: "S5 SCAN MIRROR" | | | | | |
| XDE: 0.000000 | YDE: −0.785633 | ZDE: 0.000000 DAR | | | |
| XDC: 100 | YDC: 100 | ZDC: 100 | | | |
| ADE: 1.310330 | BDE: 0.000000 | CDE: 0.000000 | | | |
| ADC: 100 | BDC: 100 | CDC: 100 | | | |
| 20: | INFINITY | −2.885136 | | 100 | 100 |
| XDE: 0.000000 | YDE: 0.000000 | ZDE: 0.000000 | | | |
| XDC: 100 | YDC: 100 | ZDC: 100 | | | |
| ADE: 13.798673 | BDE: 0.000000 | CDE: 0.000000 | | | |
| ADC: 100 | BDC: 100 | CDC: 100 | | | |
| 21: | 17.81289 | 2.540932 | REFL | 100 | 100 |
| SLB: "OBJECTIVE PRIMARY" | | | | | |
| ASP: | | | | | |
| K: −0.050394 | | KC: 100 | | | |
| CUF: 0.000000 | | CCF: 100 | | | |
| A: 0.479822E−04 | B: −.157611E−06 | C: 0.166291E−08 | D: −.744067E−11 | | |
| AC: 100 | BC: 100 | CC: 100 | DC: 100 | | |
| XDE: 0.000000 | YDE: 5.000000 | ZDE: 0.000000 | | | |
| XDC: 100 | YDC: 100 | ZDC: 100 | | | |
| ADE: −29.098164 | BDE: 0.000000 | CDE: 0.000000 | | | |
| ADC: 100 | BDC: 100 | CDC: 100 | | | |
| 22: | 2.68495 | −1.278687 | REFL | 100 | 100 |
| SLB: "OBJECTIVE SECONDARY" | | | | | |
| ASP: | | | | | |
| K: −3.194411 | | KC: 100 | | | |
| CUF: 0.000000 | | CCF: 100 | | | |
| A: −.986653E−03 | B: 0.127976E−04 | C: 0.122209E−07 | D: −.404650E−09 | | |
| AC: 100 | BC: 100 | CC: 100 | DC: 100 | | |
| XDE: 0.000000 | YDE: 0.530318 | ZDE: 0.000000 | | | |
| XDC: 100 | YDC: 100 | ZDC: 100 | | | |
| ACE: 7.305534 | BDE: 0.000000 | CDE: 0.000000 | | | |
| ADC: 100 | BDC: 100 | CDC: 100 | | | |
| 23: | 11.27105 | 13.322351 | REFL | 100 | 100 |

-continued

| Sequence 1 | | | | |
|---|---|---|---|---|

SLB: "OJECTIVE TERTIARY"
ASP:
        K: −0.338665                KC: 100
        CUF: 0.000000           CCF: 100
        A: 0.313067E−03    B: −.396015E−05    C: 0.103862E−07    D: 0.345452E−11
        AC: 100               BC: 100                  CC: 100                      DC: 100
            XDE: 0.000000            YDE: 3.828393            ZDE: 0.000000
            XDC: 100                    YDC: 100                     ZDC: 100
            ADE: −19.094475          BDE: 0.000000            CDE: 0.000000
            ADC: 100                    BDC: 100                     CDC: 100
       24:          INFINITY         −3.500000                         100              100
            XDE: −0.000632          YDE: −10.188014         ZDE: 0.000000
            XDC: 100                    YDC: 100                     ZDC: 100
            ADE: 28.910565            BDE: 0.000000            CDE: 0.000000
            ADC: 100                    BDC: 100                     CDC: 100
       25:          INFINITY         −3.054891         REFL                  100            100
            XDE: 0.000000            YDE: 0.000000            ZDE: 0.000000 BEN
            XDC: 100                    YDC: 100                     ZDC: 100
            ADE: 0.000000            BDE: −45.000000          CDE: 0.000000
            ADC: 100                    BDC: 100                     CDC: 100
       26:          INFINITY         −0.079000         SAPHIR_SPECIAL      100            100
SLB: "window"
       27:          INFINITY         −0.400000                         100            100
       28:          INFINITY         −1.750000                         100            100
SLB: "Slit"
            XDE: 0.000000            YDE: 0.000000            ZDE: 0.000000 DAR
            XDC: 100                    YDC: 100                     ZDC: 100
            ADE: 0.000000            BDE: 0.000000            CDE: 0.000000
            ADC: 100                    BDC: 100                     CDC: 100
       29:          INFINITY          5.011593          REFL                  100            100
SLB: "offner fold 1"
            XDE: 0.000000            YDE: 0.000000            ZDE: 0.000000 BEN
            XDC: 100                    YDC: 100                     ZDC: 100
            ADE: −45.000000          BDE: 0.000000            CDE: 0.000000
            ADC: 100                    BDC: 100                     CDC: 100
       30:          −6.72060           −3.286846         REFL                  100            100
SLB: "OFFNER M1"
            XDE: 0.000000            YDE: −1.429346           ZDE: 0.000000
            XDC: 100                    YDC: 100                     ZDC: 100
            ADE: 0.000000            BDE: 0.000000            CDE: 0.000000
            ADC: 100                    BDC: 100                     CDC: 100
            CUM: 0.000000            THM: 0.144000            GLM:
       STO:           −3.39329           3.286846          REFL                  100            100
SLB: "OFFNER GRATING"
GRT:
            GRO: 1.000000            GRS: 0.001376
            ROC: 100                    RSC: 100
            GRX: 0.000000            GRY: 1.000000            GRZ: 0.000000
            RXC: 100                    RYC: 100                     RZC: 100
            BLT: IDEAL
            CUM: 0.000000            THM: 0.086400            GLM:
       32:          −6.72060           −3.286846         REFL                  100            100
SLB: "OFFNER M3"
            CUM: 0.000000            THM: 0.144000            GLM:
       33:          INFINITY         −2.726339                         100            100
SLB: "dummy for clearance"
       34:          INFINITY         −0.059055         SAPHIR_SPECIAL      100            100
            XDE: 0.000000            YDE: −1.277930           ZDE: 0.000000
            XDC: 100                    YDC: 100                     ZDC: 100
            ADE: −0.818637          BDE: 0.000000            CDE: 0.000000
            ADC: 100                    BDC: 100                     CDC: 100
       35:          INFINITY         −0.654000                         100            100
       36:          INFINITY         −0.059055         SAPHIR_SPECIAL      100            100
       37:          INFINITY         −0.020000                         100            100
      IMG:          INFINITY          0.000000                          100            100
SLB: "Image Plane"
            XDE: 0.000000            YDE: 0.000000            ZDE: 0.000000 DAR
            XDC: 100                    YDC: 100                     ZDC: 100
            ADE: 0.000000            BDE: 0.000000            CDE: 0.000000
            ADC: 100                    BDC: 100                     CDC: 100

| SPECIFICATION DATA | | | |
|---|---|---|---|
| EPD | 7.55000 | | |
| DIM | IN | | |
| WL | 2500.00 | 1650.00 | 800.00 |
| REF | 1 | | |

| | | Sequence 1 | | | |
|---|---|---|---|---|---|
| WTW | 1 | 0 | 0 | | |
| INI | SCR | | | | |
| XAN | 0.00000 | −0.35000 | 0.35000 | −0.72000 | 0.72000 |
| YAN | 0.00000 | 0.00000 | 0.00000 | 0.00000 | 0.00000 |
| WTF | 1.00000 | 1.00000 | 1.00000 | 1.00000 | 1.00000 |
| VUX | 0.00000 | 0.00000 | 0.00000 | 0.00000 | 0.00000 |
| VLX | 0.00000 | 0.00000 | 0.00000 | 0.00000 | 0.00000 |
| VUY | 0.00000 | 0.00000 | 0.00000 | 0.00000 | 0.00000 |
| VLY | 0.00000 | 0.00000 | 0.00000 | 0.00000 | 0.00000 |
| POL | N | | | | |

| APERTURE DATA/EDGE DEFINITIONS | |
|---|---|
| CA APE | |
| CIR S1 | 4.754554 |
| ADX S1 | 0.043219 |
| ADY S1 | −0.033584 |
| REX S2 | 6.149233 |
| REY S2 | 4.144420 |
| ADX S2 | 0.135261 |
| ADY S2 | −0.032385 |
| CIR S3 | 4.541710 |
| ADX S3 | 7.491597 |
| ADY S3 | −0.033599 |
| CIR S4 | 4.386073 |
| ADX S4 | −0.156600 |
| ADY S4 | −0.033581 |
| CIR S5 | 4.373454 |
| ADX S5 | 8.248033 |
| ADY S5 | −0.033770 |
| REX S6 | 0.943076 |
| REY S6 | 0.842771 |
| ADX S6 | 1.907594 |
| ADY S6 | −0.002493 |
| REX S7 | 0.490452 |
| REY S7 | 0.421391 |
| ADX S7 | 1.268117 |
| ADY S7 | −0.000401 |
| CIR S8 | 2.946908 |
| ADX S8 | −1.610350 |
| ADY S8 | 0.015590 |
| CIR S9 | 0.814186 |
| ADX S9 | −0.000032 |
| ADY S9 | 0.006453 |
| REX S10 | 1.032643 |
| REY S10 | 0.720453 |
| ADX S10 | 0.009769 |
| ADY S10 | 0.001212 |
| REX S11 | 0.714459 |
| REY S11 | 1.004487 |
| ADX S11 | 0.001238 |
| ADY S11 | 0.005079 |
| REX S12 | 1.192617 |
| REY S12 | 0.935466 |
| ADX S12 | −0.160030 |
| ADY S12 | −0.001249 |
| CIR S13 | 1.202290 |
| ADX S13 | 0.002091 |
| ADY S13 | 4.965633 |
| CIR S14 | 2.600000 |
| ADY S14 | 9.800000 |
| CIR S15 | 2.500000 |
| ADY S15 | 5.150000 |
| CIR S16 | 1.500000 |
| ADY S16 | 3.000000 |
| CIR S17 | 2.000000 |
| ADY S17 | 1.175000 |
| REX S18 | 1.753740 |
| REY S18 | 2.021386 |
| ADX S18 | −0.000277 |
| ADY S18 | −0.849942 |
| ELX S19 | 1.850000 |
| ELY S19 | 2.300000 |
| CIR S20 | 2.031624 |
| ADX S20 | −0.000034 |
| ADY S20 | −0.725400 |
| CIR S21 | 2.250000 |

Sequence 1

| | | |
|---|---|---|
| ADY S21 | | −7.600000 |
| CIR S22 | | 1.450000 |
| ADY S22 | | −8.000000 |
| CIR S23 | | 1.100000 |
| ADY S23 | | −12.500000 |
| REX S24 | | 0.315931 |
| REY S24 | | 0.001014 |
| ADX S24 | | −0.000041 |
| ADY S24 | | −0.000048 |
| REX S25 | | 1.300000 |
| REY S25 | | 0.650000 |
| ADX S25 | | 0.200000 |
| REX S26 | | 0.400000 |
| REY S26 | | 0.100000 |
| REX S27 | | 0.400000 |
| REY S27 | | 0.100000 |
| REX S28 | | 0.315994 |
| REY S28 | | 0.001045 |
| ADX S28 | | 0.000000 |
| ADY S28 | | −0.000038 |
| REX S29 | | 0.650000 |
| REY S29 | | 0.450000 |
| ADY S29 | | −0.060000 |
| CIR S30 | | 2.600000 |
| REX S30 | L'a1' | 1.500000 |
| REY S30 | L'a1' | 2.600000 |
| CIR S31 | | 0.545000 |
| CIR S32 | | 2.600000 |
| REX S32 | L'a2' | 1.500000 |
| REY S32 | L'a2' | 2.600000 |
| CIR S34 | | 0.500000 |
| CIR S35 | | 0.500000 |
| REX S36 | | 0.350000 |
| REY S36 | | 0.100000 |
| REX S37 | | 0.350000 |
| REY S37 | | 0.100000 |
| CIR S38 | | 0.350000 |

REFRACTIVE INDICE

| GLASS CODE | 2500.00 | 1650.00 | 800.00 |
|---|---|---|---|
| SAPHIR_SPECIAL | 1.726257 | 1.744460 | 1.760196 |

No solves defined in system
No pickups defined in system

ZOOM DATA

| | POS 1 | POS 2 | POS 3 | POS 4 | POS 5 | POS 6 | POS 7 | POS 8 | POS 9 |
|---|---|---|---|---|---|---|---|---|---|
| WTW W1 | 1 | 1 | 1 | 0 | 0 | 0 | 0 | 0 | 0 |
| WTW W2 | 0 | 0 | 0 | 1 | 1 | 1 | 0 | 0 | 0 |
| WTW W3 | 0 | 0 | 0 | 0 | 0 | 0 | 1 | 1 | 1 |
| REF | 1 | 1 | 1 | 2 | 2 | 2 | 3 | 3 | 3 |
| YAN F1 | 0.00000 | −0.72000 | 0.72000 | 0.00000 | −0.72000 | 0.72000 | 0.00000 | −0.72000 | 0.72000 |
| YAN F2 | 0.00000 | −0.72000 | 0.72000 | 0.00000 | −0.72000 | 0.72000 | 0.00000 | −0.72000 | 0.72000 |
| YAN F3 | 0.00000 | −0.72000 | 0.72000 | 0.00000 | −0.72000 | 0.72000 | 0.00000 | −0.72000 | 0.72000 |
| YAN F4 | 0.00000 | −0.72000 | 0.72000 | 0.00000 | −0.72000 | 0.72000 | 0.00000 | −0.72000 | 0.72000 |
| YAN F5 | 0.00000 | −0.72000 | 0.72000 | 0.00000 | −0.72000 | 0.72000 | 0.00000 | −0.72000 | 0.72000 |
| VUY F1 | 0.00000 | 0.00000 | 0.00000 | 0.00000 | 0.00000 | 0.00000 | 0.00000 | 0.00000 | 0.00000 |
| VLY F1 | 0.00000 | 0.00000 | 0.00000 | 0.00000 | 0.00000 | 0.00000 | 0.00000 | 0.00000 | 0.00000 |
| VUY F2 | 0.00000 | 0.00000 | 0.00000 | 0.00000 | 0.00000 | 0.00000 | 0.00000 | 0.00000 | 0.00000 |
| VLY F2 | 0.00000 | 0.00000 | 0.00000 | 0.00000 | 0.00000 | 0.00000 | 0.00000 | 0.00000 | 0.00000 |
| VUY F3 | 0.00000 | 0.00000 | 0.00000 | 0.00000 | 0.00000 | 0.00000 | 0.00000 | 0.00000 | 0.00000 |
| VLY F3 | 0.00000 | 0.00000 | 0.00000 | 0.00000 | 0.00000 | 0.00000 | 0.00000 | 0.00000 | 0.00000 |
| VUY F4 | 0.00000 | 0.00000 | 0.00000 | 0.00000 | 0.00000 | 0.00000 | 0.00000 | 0.00000 | 0.00000 |
| VLY F4 | 0.00000 | 0.00000 | 0.00000 | 0.00000 | 0.00000 | 0.00000 | 0.00000 | 0.00000 | 0.00000 |
| VUY F5 | 0.00000 | 0.00000 | 0.00000 | 0.00000 | 0.00000 | 0.00000 | 0.00000 | 0.00000 | 0.00000 |
| VLY F5 | 0.00000 | 0.00000 | 0.00000 | 0.00000 | 0.00000 | 0.00000 | 0.00000 | 0.00000 | 0.00000 |
| VUX F1 | 0.00000 | 0.00000 | 0.00000 | 0.00000 | 0.00000 | 0.00000 | 0.00000 | 0.00000 | 0.00000 |
| VLX F1 | 0.00000 | 0.00000 | 0.00000 | 0.00000 | 0.00000 | 0.00000 | 0.00000 | 0.00000 | 0.00000 |
| VUX F2 | 0.00000 | 0.00000 | 0.00000 | 0.00000 | 0.00000 | 0.00000 | 0.00000 | 0.00000 | 0.00000 |
| VLX F2 | 0.00000 | 0.00000 | 0.00000 | 0.00000 | 0.00000 | 0.00000 | 0.00000 | 0.00000 | 0.00000 |
| VUX F3 | 0.00000 | 0.00000 | 0.00000 | 0.00000 | 0.00000 | 0.00000 | 0.00000 | 0.00000 | 0.00000 |
| VLX F3 | 0.00000 | 0.00000 | 0.00000 | 0.00000 | 0.00000 | 0.00000 | 0.00000 | 0.00000 | 0.00000 |
| VUX F4 | 0.00000 | 0.00000 | 0.00000 | 0.00000 | 0.00000 | 0.00000 | 0.00000 | 0.00000 | 0.00000 |
| VLX F4 | 0.00000 | 0.00000 | 0.00000 | 0.00000 | 0.00000 | 0.00000 | 0.00000 | 0.00000 | 0.00000 |
| VUX F5 | 0.00000 | 0.00000 | 0.00000 | 0.00000 | 0.00000 | 0.00000 | 0.00000 | 0.00000 | 0.00000 |

-continued

| Sequence 1 | | | | | | | | | |
|---|---|---|---|---|---|---|---|---|---|
| VLX F5 | 0.00000 | 0.00000 | 0.00000 | 0.00000 | 0.00000 | 0.00000 | 0.00000 | 0.00000 | 0.00000 |
| ADE S19 | 1.31033 | 0.49587 | 2.11464 | 1.31033 | 0.49587 | 2.11464 | 1.31033 | 0.49587 | 2.11464 |
| ADC S19 | 100 | 100 | 100 | 100 | 100 | 100 | 100 | 100 | 100 |

This is a non-symmetric system. If elements with power are decentered or tilted, the first order properties are probably inadequate in describing the system characteristics.

| | POS 1 | POS 2 | POS 3 | POS 4 | POS 5 | POS 6 | POS 7 | POS 8 | POS 9 |
|---|---|---|---|---|---|---|---|---|---|
| | | | | INFINITE CONJUGATES | | | | | |
| EFL | −7.7434 | −7.7434 | −7.7434 | −7.7435 | −7.7435 | −7.7435 | −7.7435 | −7.7435 | −7.7435 |
| BFL | 15.4225 | 15.4225 | 15.4225 | 15.4214 | 15.4214 | 15.4214 | 15.4206 | 15.4206 | 15.4206 |
| FFL | 80.4648 | 80.4648 | 80.4648 | 80.4648 | 80.4648 | 80.4648 | 80.4648 | 80.4648 | 80.4648 |
| FNO | 1.0256 | 1.0256 | 1.0256 | 1.0256 | 1.0256 | 1.0256 | 1.0256 | 1.0256 | 1.0256 |
| IMG DIS | −0.0200 | −0.0200 | −0.0200 | −0.0200 | −0.0200 | −0.0200 | −0.0200 | −0.0200 | −0.0200 |
| OAL | 3.8358 | 3.8358 | 3.8358 | 3.8358 | 3.8358 | 3.8358 | 3.8358 | 3.8358 | 3.8358 |
| | | | | PARAXIAL IMAGE | | | | | |
| HT | 0.0000 | 0.0973 | 0.0973 | 0.0000 | 0.0973 | 0.0973 | 0.0000 | 0.0973 | 0.0973 |
| ANG | 0.0000 | 0.7200 | 0.7200 | 0.0000 | 0.7200 | 0.7200 | 0.0000 | 0.7200 | 0.7200 |
| | | | | ENTRANCE PUPIL | | | | | |
| DIA | 7.5500 | 7.5500 | 7.5500 | 7.5500 | 7.5500 | 7.5500 | 7.5500 | 7.5500 | 7.5500 |
| THI | 80.8880 | 80.8880 | 80.8880 | 80.8880 | 80.8880 | 80.8880 | 80.8880 | 80.8880 | 80.8880 |
| | | | | EXIT PUPIL | | | | | |
| DIA | 138.1385 | 138.1385 | 138.1385 | 138.1382 | 138.1382 | 138.1382 | 138.1378 | 138.1376 | 138.1378 |
| THI | 157.1004 | 157.1004 | 157.1004 | 157.0997 | 157.0997 | 157.0997 | 157.0991 | 157.0991 | 157.0991 |
| STO DIA | 1.0665 | 1.0596 | 1.0886 | 1.0665 | 1.0596 | 1.0888 | 1.0665 | 1.0596 | 1.0888 |

While the foregoing represents preferred embodiment of the invention, it will be understood by those skilled in the art that various modifications and changes may be made without departing from the spirit and scope of the invention, and that the invention includes all such modifications and changes as are within the bounds of the following claims.

What is claimed is:

1. An airborne hyperspectral scanning system with a reflective telecentric relay comprises:
   a fore-optics, the fore-optics comprising three mirrors, sequentially ordered, and in optical alignment with each other, the first mirror being configured to collect and reflect electromagnetic radiation, and the third mirror being configured to form an intermediate image from the reflected electromagnetic radiation;
   an imaging spectrometer, the imaging spectrometer comprising a spectrometer slit, the spectrometer slit having an exit side and an entrance side, a focal plane array, a fold mirror, and at least three spectrometer mirrors, ordered sequentially, and in optical alignment with each other, the primary spectrometer mirror receiving light from the fold mirror, and disposed in operative relation to the exit side of the spectrometer slit, the last spectrometer mirror situated such that it receives the light from the primary spectrometer mirror through at least one intermediate mirror and directing the light to the focal plane array, the one or more intermediate mirrors having diffraction gratings;
   a reflective telecentric relay, mounted in the housing between the fore-optics and the imaging spectrometer, the reflective telecentric relay comprising a collimator module, a scanning mirror module, and an objective module, the collimator module comprising at least four relay mirrors and the objective module comprising at least three objective mirrors each having an optical power, the objective module being situated to receive an intermediate image from the fore-optics and reflect a collimated beam to the scanning mirror module, the scanning mirror module comprising a scanning mirror and being positioned in a telecentric path between the collimator module and the objective module, and reflecting the intermediate collimated beam to the objective module, wherein the objective module is situated to form a telecentric image at an entrance of the spectrometer slit; and
   wherein each reflective relay mirror is decentered with respect to each other so that a geometrical axis of each of telecentric relay mirror does not coincide with a chief ray of the beam.

2. The hyperspectral scanning system with reflective telecentric relay in claim 1, wherein the fore-optics mirrors are decentered with respect to an object.

3. The hyperspectral scanning system with reflective telecentric relay in claim 1, wherein the spectrometer mirrors are decentered with respect to each other.

4. The hyperspectral scanning system with reflective telecentric relay in claim 1, wherein the fore-optics is in the form of a three-mirror anastigmat.

5. The hyperspectral scanning system with reflective telecentric relay in claim 1, wherein the imaging spectrometer is doubly telecentric.

6. The hyperspectral scanning system with reflective telecentric relay in claim 1, wherein the image at the slit formed by the relay is optically corrected for field curvature.

7. The hyperspectral scanning system with reflective telecentric relay in claim 1, wherein the image formed by relay is optically corrected for distortion.

8. The hyperspectral scanning system with reflective telecentric relay in claim 1, wherein the spectral image formed on the focal plane array is optically corrected for spatial and spectral distortion in smile and key stone.

9. The hyperspectral scanning system with reflective telecentric relay in claim 1, wherein one or more of the reflective surfaces of the fore-optics mirrors are segments of general aspheres.

10. The hyperspectral scanning system with reflective telecentric relay in claim 1, wherein one or more of the reflective surfaces of the relay mirrors are segments of general aspheres.

11. The hyperspectral scanning system with reflective telecentric relay in claim 1, wherein one or more of the reflective surfaces of the spectrometer mirrors are segments of general aspheres.

12. The hyperspectral scanning system with reflective telecentric relay in claim 1, wherein one or more of the reflective surfaces of the fore-optics mirrors are segments of spherical surfaces.

13. The hyperspectral scanning system with reflective telecentric relay in claim 1, wherein one or more of the reflective surfaces of the relay mirrors are segments of spherical surfaces.

14. The hyperspectral scanning system with reflective telecentric relay in claim 1, wherein one or more of the reflective surfaces of the spectrometer mirrors are segments of spherical surfaces.

15. The hyperspectral scanning system with reflective telecentric relay in claim 1, wherein spectrometer primary and tertiary mirrors surfaces are the segments of one spherical surface.

16. The hyperspectral scanning system with reflective telecentric relay in claim 1, wherein the relationships between fore-optics aperture stop decenter, field of view and fore-optics focal length along the chief ray are related as follows:

$$\Delta_{STOP}=0.02\text{-}0.04 \text{ EFLc}$$

$$tg\theta \times EFLc=-0.6\text{--}0.8 \text{ inches}$$

Wherein
$\Delta_{STOP}$ is the decenter of the fore-optics aperture stop with respect to the fore-optics common axis along the axis parallel to the slit length;
$tg\theta$ is the tangent of the half of view angle;
EFLc is the fore-optics focal length in inches along the chief ray.

17. The hyperspectral scanning system with reflective telecentric relay in claim 1, wherein relationships between constructive parameters of the fore-optics are related as follows:

$$\Phi_1/\Phi_2=(-0.24) \text{ to } (-0.44)$$

$$\Phi_1/\Phi_3=0.50 \text{ to } 0.70$$

$$\Phi_1/\Phi_C=0.25\text{-}0.44$$

$$D_1/D_2=0.55\text{-}0.85$$

$$D_1/EFL_C=0.15\text{-}0.30$$

Wherein
$\Phi_1$, $\Phi_2$ and $\Phi_3$ are optical powers along the chief ray of the primary, the secondary, and the tertiary fore-optics mirrors respectively;
$\Phi_C$ is the optical power along the chief ray of the fore-optics;
$D_1$ and $D_2$ are the distances along the chief ray between the primary and secondary fore-optics mirrors;
$EFL_C$ is the focal length along the chief ray of the fore-optics.

18. The hyperspectral scanning system with reflective telecentric relay in claim 1, wherein relationships between constructive parameters of the relay are related as follows:

$$\Phi_{1CC}/\Phi_{2CC}=(-5.50)\text{-}(-6.50)$$

$$\Phi_{2CC}/\Phi_{3CC}=2.50\text{-}3.60$$

$$\Phi_{3CC}/\Phi_{4CC}=(-0.25)\text{-}(-0.50)$$

$$\Phi_{6OC}/\Phi_{7OC}(-4.10)\text{-}(-4.85)$$

$$\Phi_{7OC}/\Phi_{8OC}=(-0.10)\text{-}(-0.35)$$

$$\Phi_{RC}/\Phi_{OC}=(0.60)\text{-}(-0.80)$$

$$\Phi_{CC}/\Phi_{OC}=(-0.35)\text{-}(-0.50)$$

$$EFL_{RC}/OP_{RC}=0.08\text{-}0.20$$

$$EFL_{RC}/EFL_{TMAC}=2.50\text{-}3.50$$

$$EFL_{RC}/EFL_{TMAC}=0.075\text{-}0.095$$

Wherein
$\Phi_{1CC}$, $\Phi_{2CC}$, $\Phi_{3CC}$, $\Phi_{4CC}$ are optical powers along the chief ray of the relay collimator module first, second, third and fourth mirrors;
$\Phi_{6OC}$, $\Phi_{7OC}$, $\Phi_{8OC}$ are optical powers along the chief ray of relay objective module sixth, seventh and eighth mirrors;
$\Phi_{RC}$, $\Phi_{CC}$ and $\Phi_{OC}$ are optical powers along the chief ray of the relay and collimating and objective modules correspondingly;
$EFL_{RC}$ is effective focal length along the chief ray of the relay;
$OP_{RC}$ is optical path along the chief ray between the relay first and last mirrors;
$EFL_{RP}$ is paraxial effective focal length of the relay;
$EFL_C$ is fore-optics effective focal length along the chief ray.

19. The hyperspectral scanning system with reflective telecentric relay in claim 1, wherein relationships between constructive parameters of the imaging spectrometer are related as follows:

$$\Phi_{1SC}/\Phi_{2SC}=0.40\text{-}0.60$$

$$\Phi_{1SC}/\Phi_{3SC}=0.85\text{-}1.15$$

$$\Delta_{SLIT}/EFL_{1SC}=0.35\text{-}0.45$$

$$EFL_{1SC}/EFL_{RC}=0.70\text{-}0.80$$

Wherein
$\Phi_{1SC}$, $\Phi_{2SC}$ and $\Phi_{3SC}$ are optical powers along the chief ray of the primary, the secondary and the tertiary imaging spectrometer mirrors respectively;
$\Delta_{SLIT}$ is the decentration of the slit in direction perpendicular to the slit long side with respect to the geometrical axis of the spectrometer primary mirror;
$EFL_{1SC}$ is the effective focal length along the chief ray of the spectrometer primary mirror;
$EFL_{RC}$ is the effective focal length along the chief ray of the relay.

20. An airborne hyperspectral scanning system with reflective telecentric relay comprises:
a fore-optics, the fore-optics being anastigmatic and comprising at least three mirrors, sequentially ordered, and in optical alignment with each other and having the same geometrical axis of symmetry, the first mirror being configured to collect and reflect electromagnetic radiation, and the last mirror being configured to form an intermediate image from the reflected electromagnetic radiation;
an imaging spectrometer, the imaging spectrometer being doubly telecentric and comprising a spectrometer slit, the spectrometer slit having an exit side and an entrance side, a focal plane array, a fold mirror, and at least three spectrometer mirrors, ordered sequentially, and in optical alignment with each other and having the same geometrical axis of symmetry, the primary spectrometer mirror receiving light from the fold mirror, and disposed in operative relation to the exit side of the spectrometer slit, the last spectrometer mirror situated such that it receives the light from the primary spectrometer mirror through at least one intermediate mirror and directing the light to the focal plane array, the one or more intermediate mirrors having diffraction gratings;

a reflective telecentric relay, mounted between the fore-optics and the imaging spectrometer, the reflective telecentric relay comprising a collimator module, a scanning mirror module, and an objective module, the collimator module comprising at least four relay mirrors and the objective module comprising at least three objective mirrors each having an optical power, the objective module being situated to receive an intermediate image from the fore-optics and reflect a collimated beam to the scanning mirror module, the scanning mirror module comprising a scanning mirror and being positioned in a telecentric path between the collimator module and the objective module, and reflecting the intermediate collimated beam to the objective module, wherein the objective module is situated to form a telecentric image at the entrance of the spectrometer slit; and wherein each reflective relay mirror is decentered with respect to each other so that a geometrical axis of each of telecentric relay mirror does not coincide with a chief ray of the beam.

21. An airborne hyperspectral scanning system with reflective telecentric relay comprises:

a fore-optics including a primary fore-optics mirror, a secondary fore-optics mirror, and a tertiary fore-optics mirror each having an associated reflective surface, wherein the primary mirror directs toward a reflective surface of the secondary mirror, the secondary mirror directs light toward the reflective surface of the tertiary mirror, and the tertiary mirror forms an intermediate image corresponding to an object at an entrance side of a reflective telecentric relay;

the reflective telecentric relay including a collimator, a scanning mirror, and an objective modules, wherein three modules conjugate an intermediate image after a fore-optics with a slit before an imaging spectrometer;

wherein the collimator module comprises a relay primary mirror, a relay secondary mirror, a relay tertiary mirror, and a relay fourth mirror, wherein the relay primary mirror is disposed in operative relation to an exit side of the fore-optics and converges beam from the fore-optics intermediate image, directing it onto the secondary relay mirror, wherein the secondary relay mirror further converges the beam and directs it onto the relay tertiary mirror, wherein the relay tertiary mirror diverges the beam and directs it to the relay fourth mirror;

wherein the scanning mirror is a relay fifth mirror which is placed between the collimator and objective modules, and performs the cross field scan;

wherein the objective module comprises a relay sixth mirror, a relay seventh mirror, and a relay eighth mirror to, the relay sixth mirror being disposed in operative relation to an exit side of the scanning mirror and directing converged radiation onto the relay sixth mirror, relay seventh mirror diverging the radiation and directing it onto the relay seventh mirror, relay eighth mirror forming an intermediate telecentric image at an entrance side of a spectrometer slit;

the imaging spectrometer including a primary spectrometer mirror, a secondary spectrometer mirror, and a tertiary spectrometer mirror, each of which has an associated reflective surface, wherein the primary spectrometer mirror is disposed in operative relation to an exit side of the spectrometer slit, and the secondary spectrometer mirror has an associated diffraction grating; and a focal plane array, wherein the primary, the secondary, and the tertiary mirrors of the imaging spectrometer are configured so that light from an exit side of the spectrometer slit is received on the reflective surface of the primary spectrometer mirror and directed toward a diffraction grating of the secondary spectrometer mirror, diffracted light from the grating is received on the reflective surface of the tertiary spectrometer mirror, and the tertiary mirror forms a spectral image representing spectral components of the object on the focal plane array.

* * * * *